Patented Sept. 1, 1936

2,052,740

UNITED STATES PATENT OFFICE 2,052,740

SOLDER FOR ALUMINUM AND METHOD OF SOLDERING

Clifford L. Barber and Perry C. Ripley, Chicago, Ill., assignors to Kester Solder Company, Chicago, Ill., a corporation of Illinois No Drawing. Application January 10, 1934, Serial No. 706,046

10 Claims. (Cl. 113—112)

This invention relates to a tubular cored solder for use in the soldering of aluminum and also to a method of soldering aluminum. More particularly the invention relates to a tubular cored solder of substantially pure tin having a core of a flux obtained by fusing together a mixture of a metal chloride, such as zinc chloride, and a higher molecular weight organic acid, such as one of the higher molecular weight fatty acids, stearic, palmitic or oleic.

Although the soldering of aluminum has received a great deal of attention from workers in this field, no entirely satisfactory solder for or method of soldering aluminum has been heretofore devised, to the best of our knowledge. This appears to have been due largely to a lack of appreciation of the problems involved in the soldering of aluminum.

One serious obstacle to the obtaining of a satisfactorily soldered job on aluminum is presented by the activity of aluminum toward oxygen and the dense, closely adhering nature of the oxide film that persistently forms on all aluminum surfaces.

Another problem in the soldering of aluminum is occasioned by the relatively poor dissolving or alloying capacity of soldering metals for aluminum and by the extremely sluggish character of the aluminum alloy formed in soldering.

Since the soldering of aluminum involves the formation of a solution or an alloy between the solder metal and the aluminum, it is obviously necessary to penetrate the oxide film on the aluminum if a satisfactory bond is to be obtained. Aluminum oxide, however, does not respond to the reducing action of fluxes, as do the oxides of other common metals. We have found that it is necessary in aluminum soldering to rupture the oxide film mechanically rather than chemically, as for instance, by scratching the oxidized surface with the soldering iron.

Since such mechanical rupturing of the oxide film causes the oxide to become admixed with the soldering metal and to impart porosity and roughness to the solder joint, it is necessary to remove the oxide contaminated solder before completing the soldering operation. According to our method, therefore, the preliminary soldering steps include mechanically rupturing the oxide film to allow the solder to wet and dissolve the aluminum metal, and then removing the excess molten solder and admixed oxide and dissolved aluminum.

This preliminary step of removing any excess molten solder and dissolved aluminum oxide also eliminates the difficulty previously experienced because of the sluggish character imparted to the solder by the dissolved aluminum. When present in amounts even as low as 0.01%, the aluminum imparts extreme sluggishness and frostiness to the molten solder alloy and a rough, porous and unsightly finish to the soldered joint results unless care is taken to remove the contaminated molten solder before completing the soldering of the joint.

Because of the great affinity of aluminum for oxygen, it is further necessary, in order to obtain a satisfactory bond between the aluminum and the solder, to protect the newly formed aluminum surfaces from the air. We have found that this can be best accomplished by the use of a relatively immobile flux of a non-corrosive character, and by employing such flux as the core material of tubular tin solder. In this way the flux is applied simultaneously with the tin solder and protects both the tin and the aluminum surfaces.

Heretofore, either no flux at all has been employed in soldering aluminum, or else the flux has been used as an external flux. Where the flux is applied externally and the solder melted on top of the fluxed aluminum surface, the solder itself has ample time to oxidize while being melted. Furthermore, the soldering heat causes the flux to flow away from the point of application and leave a carbonized and ineffective residue. That previously used fluxes are generally inadequate is attested to by the fact that practically all aluminum solders are recommended for use without a flux.

We have found that substantially pure tin may be most satisfactorily used as the solder for soldering aluminum, both because tin is soluble in aluminum in all proportions and also because tin is completely liquid at about 232° C. and therefore permits the use of ordinary "soft solder" temperatures in the soldering operation. As is obvious, the best solder, from the standpoint of soldering effectiveness, is one that is most soluble in the metal to be soldered.

The use of tin also obviates the necessity of using high fusion temperatures, which cause greater oxidation of the aluminum and thus make the soldering operation more difficult. Moreover, because of the high thermal conductivity of aluminum, it is difficult, where high temperature fusion is required, to supply sufficient heat to the aluminum work to raise the temperature of the work to that required.

It is therefore an important object of this invention to provide a cored tin tubular solder for use in the soldering of aluminum.

It is a further important object of this invention to provide a cored tubular solder composed of substantially pure tin and having a core of flux material of a substantially non-corrosive character and peculiarly adapted for use in the soldering of aluminum.

It is a further important object of this invention to provide a method of soldering aluminum by the use of substantially pure tin as the solder and the use of a flux comprising the reaction product of a metal chloride and a higher molecular weight fatty acid.

It is a further important object of this invention to provide an improved method of soldering aluminum that involves a preliminary tinning of the portion of the aluminum surface to be soldered, followed by the removal of the excess molten tin solder and impurities contained therein and the subsequent soldering of the tinned surface.

Other and further important objects of this invention will become apparent from the following description and appended claims.

We prefer to use substantially pure tin as the solder for soldering aluminum. We have found that the purer the tin used as a solder, the more satisfactory is the soldering operation. Consequently, the purest available commercial tin is employed in the preparation of our aluminum solder.

On the other hand, it will be appreciated that the advantages of our invention can still be secured, but to a lessened extent, if small percentages of alloying ingredients are present in the tin solder. Since the addition of alloying elements, such as zinc, cadmium, bismuth, lead and copper do not improve the efficiency of the tin solder for soldering aluminum, we prefer to use substantially pure tin as the sole solder metal.

In its preferred form, the solder of our invention is prepared as a cored tubular solder of substantially pure tin having a core of flux material that is relatively immobile at the soldering temperatures. Such a flux material may be prepared by reacting a metal chloride, such as zinc, magnesium or calcium chloride, with a higher molecular weight organic acid, such as any of the so-called high molecular weight fatty acids—stearic, palmitic and oleic—or the organic acid constituents of fats, oils, waxes and resins. The fatty acids, waxes or resins by themselves are usable but too mobile to be entirely satisfactory.

Our preferred flux material is prepared by reacting an anhydrous mixture of zinc chloride and stearic acid at or above the fusion temperature of the mixture, preferably at about 250° C. In preparing such a reaction product, the stearic acid is first heated to about 250° C. and solid zinc chloride is gradually added with stirring and the heating continued until the free inorganic salt, which originally settles to the bottom of the reaction vessel, has reacted with the stearic acid to form a completely homogeneous product.

Since the velocity of the reaction is a function of the surfaces of the constituents that are exposed to each other, the reaction may be accelerated by vigorous stirring. If the salt is very finely ground and the material agitated with a mechanical stirrer, the reaction is very rapid and for small proportions of zinc chloride may go to completion in a few minutes. The maximum proportion by weight of zinc chloride to stearic acid that may be reacted with the stearic acid to form a product substantially free from free zinc chloride is approximately 2 parts of zinc chloride to 3 parts of stearic acid.

In general, the proportion of zinc chloride to stearic acid should lie between 1 part and 4 parts of zinc chloride to 6 parts of stearic acid by weight. Our preferred composition contains about 20% of zinc chloride by weight of the reaction mixture. The final reaction product is entirely homogeneous when examined under the microscope and does not show any free crystals of free zinc chloride.

The cored tubular solder of our invention may be prepared in any of the known ways, such as the extrusion methods. Preferably, the flux material is between 3 and 4% by weight of the cored tubular solder and in any event not more than 10%.

In using the cored tubular solder, the soldering operation is substantially as follows:

Before actually starting the solder operation, the work is cleaned thoroughly by scouring, scraping, filing or grinding to remove any grease and the coating of oxide that is always present on aluminum ware. If a thick, heavy aluminum piece is to be repaired, such as a cracked engine crankcase, a cylinder head or cast aluminum object of considerable weight, it is advisable to chisel or grind away a considerable proportion of the total thickness of the injured wall in the form of a V shaped trench of about 90°, keeping the crack at the bottom of the trench.

The soldering iron, which should be a relatively heavy one for aluminum soldering, is heated and the working faces of the iron are coated with the fused solder from the cored tubular tin solder of our invention. A small amount of the cored tubular solder is next melted under the iron on the spot to be soldered and with a slow rotary motion, the face of the iron is rubbed back and forth on this spot, using a fair amount of pressure. As this motion is continued for a minute or so, it will be observed that the solder starts to stick in spots.

A further small amount of solder is added in the same manner to the portion of the aluminum surface being soldered and the rubbing is continued with the iron face pressed firmly against the work. The solder soon shows a decidedly adhesive disposition toward the aluminum and also exhibits a granular and stringy consistency. As soon as the solder appears to stick uniformly on the entire surface of the work, the soldering iron is lifted and the melted solder completely wiped off the work, as by rubbing with steel wool. This should be done quickly, as the solder will harden very rapidly after the soldering iron is removed.

The surface of the work undergoing repair should now be completely tinned, as will be apparent from the difference in color between the tinned and untinned surfaces. The soldering iron is next reheated and carefully wiped free of any melted, stringy or granular solder that may cling to its working faces from the rubbing operation. A sufficient amount of the cored tubular solder is then melted onto the surface portion being repaired to fill the fracture or the like. During this filling step, the iron should not be moved back and forth as in tinning, for if it is, so much aluminum will be worked up into the solder that the repair will be rough and stringy. The tin solder and flux should spread and distribute evenly and smoothly without much iron movement.

The work is then allowed to cool undisturbed so as to avoid any fracture or imperfection in the soldered repair.

An important feature of our process is that the aluminum surface to be repaired is first tinned and then the soldering operation carried out in accordance with the usual soft solder practices. In order to satisfactorily tin the surface of the aluminum object that is to be repaired, it is of course essential that the flux prevent the reoxidation of the aluminum surfaces under the temperature conditions of the soldering operation. The flux of our invention that is described above has been found to accomplish this function most efficiently.

We are aware that numerous details of the process may be varied through a wide range without departing from the principles of this invention, and we, therefore, do not purpose limiting the patent granted hereon otherwise than necessitated by the prior art.

We claim as our invention:

1. A cored tubular solder for use in soldering aluminum, comprising a tubular solder composed of substantially pure tin and a core of a substantially non-corrosive reaction product of a metal chloride and an organic acid.

2. A cored tubular solder for use in soldering aluminum, comprising a tubular solder composed of substantially pure tin and a core of a fused reaction product of a zinc chloride and a higher fatty acid.

3. A cored tubular solder for use in soldering aluminum, comprising a tubular solder composed of substantially pure tin and a core of the reaction product obtained by fusing a mixture of zinc chloride and stearic acid in the proportion of not over 2 parts of zinc chloride to 3 parts by weight of stearic acid.

4. A cored tubular solder for use in soldering aluminum, comprising a tubular solder composed of substantially pure tin and a core of the reaction product obtained by fusing a mixture of zinc chloride and stearic acid in the proportion of about 1 part of zinc chloride to 4 parts of stearic acid.

5. A cored tubular solder for use in soldering aluminum, comprising a tubular solder of substantially pure tin and a core consisting of an anhydrous fusion product of not less than 1 part nor more than 4 parts of zinc chloride to 6 parts of stearic acid by weight.

6. A cored tubular tin solder for soldering aluminum, the solder portion of which is substantially pure tin and the core of which is a relatively immobile, non-corrosive flux, the percentage of flux core to the total of solder plus core being less than 10% by weight.

7. The method of soldering aluminum which comprises mechanically cleaning an aluminum surface to be soldered, melting a cored pure tin solder having a relatively immobile non-corrosive flux core on the cleaned surface to tin the surface, wiping off the excess molten tin, admixed oxides and dissolved aluminum from the surface and applying an additional amount of molten pure tin to the tinned surface to complete the soldered joint, said molten tin being maintained at temperatures just sufficient to prevent a solidification of the tin.

8. A method of soldering aluminum which comprises mechanically cleaning an aluminum surface to be soldered to rupture the oxide film thereon, melting a portion of cored tubular pure tin solder having a relatively immobile non-corrosive flux core on the cleaned surface of the aluminum, mechanically scraping said surface with the continued application of heat thereto until the molten metal on said surface assumes a stringy character, wiping off the excess of said molten metal and applying more of said pure tin solder and flux to said surface without mechanically disturbing said surface, said molten tin being maintained at temperatures just sufficient to prevent a solidification of the metal.

9. The method of soldering aluminum which comprises mechanically cleaning the surface portion of the aluminum to be soldered, fusing a cored tubular pure tin solder having a relatively immobile non-corrosive flux core onto said surface while continuously heating and agitating the fused tin thereon, wiping off the excess molten tin from said surface and applying a further quantity of the cored pure tin solder and flux thereon, said tin solder being maintained at temperatures just sufficient to prevent a solidification of the metal.

10. A method of soldering aluminum which comprises melting on an aluminum surface a cored tubular pure tin solder having a core comprising the reaction product of a metal chloride and an organic acid, mechanically scraping said surface with the continued application of heat thereto until the molten metal on the surface assumes a stringy character, wiping off the excess of said molten metal and reapplying said cored tubular pure tin solder and flux to said surface without mechanically disturbing said surface, said tin solder being maintained at temperatures just sufficient to prevent a solidification thereof.

CLIFFORD L. BARBER.
PERRY C. RIPLEY.